United States Patent
Murphy (10) Patent No.: US 11,562,183 B1
(45) Date of Patent: Jan. 24, 2023

(54) SYSTEM AND METHOD FOR RF DETECTION, LOCALIZATION, AND CLASSIFICATION

(71) Applicant: Rockwell Collins, Inc., Cedar Rapids, IA (US)

(72) Inventor: Ryan M. Murphy, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/407,804

(22) Filed: Aug. 20, 2021

(51) Int. Cl.
*G06K 9/62* (2022.01)

(52) U.S. Cl.
CPC ................................. *G06K 9/6278* (2013.01)

(58) Field of Classification Search
CPC ............. G06K 9/6226; G06K 9/00536; G06K 9/6278; G06K 9/6277; G06K 9/6267; G06K 9/6268
See application file for complete search history.

(56) References Cited

U.S. PATENT DOCUMENTS

| | | |
|---|---|---|
| 8,326,240 B1 | 12/2012 | Kadambe et al. |
| 8,699,971 B1 | 4/2014 | Kadambe et al. |
| 9,450,688 B1 | 9/2016 | Murphy |
| 9,692,529 B1 | 6/2017 | Music et al. |
| 9,804,253 B2 | 10/2017 | Nijsure |
| 10,645,601 B2 | 5/2020 | Kleinbeck et al. |
| 2008/0293353 A1* | 11/2008 | Mody ...................... H04K 3/94 455/1 |
| 2009/0047920 A1* | 2/2009 | Livsics .................. H04B 1/719 455/226.1 |
| 2009/0299665 A1* | 12/2009 | Irizarry .............. G06K 9/00536 704/205 |
| 2019/0253905 A1* | 8/2019 | Kleinbeck ............ H04B 17/318 |

FOREIGN PATENT DOCUMENTS

CN 111181671 A 5/2020

* cited by examiner

*Primary Examiner* — Abhishek Sarma
(74) *Attorney, Agent, or Firm* — Suiter Swantz pc llo (57) ABSTRACT

A system and method for detecting, localizing, and classifying RF signals via probability analysis in the decision space include receiving a wideband IQ sample stream and performing a probability analysis to isolate noise from the magnitude spectrum. Derived probability information is used for RF detection and localization. The probability analysis is a Bayesian probability analysis and the detection and localization algorithm is a modified "you only look once" (YOLO) algorithm.

20 Claims, 10 Drawing Sheets

SYSTEM AND METHOD FOR RF DETECTION, LOCALIZATION, AND CLASSIFICATION

BACKGROUND

Real-time signal detection, localization, and classification in noisy, cluttered RF environments is a difficult problem. Existing systems in RF machine learning focus on utilizing the You Only Look Once (YOLO) algorithm applied to wideband RF spectrograms to jointly detect, localize (i.e. frequency, bandwidth, SNR etc.), and classify emitters. Estimating these parameters degrades in low SNR conditions.

SUMMARY

In one aspect, embodiments of the inventive concepts disclosed herein are directed to a system and method for detecting, localizing, and classifying RF signals via probability analysis in the decision space. A wideband IQ sample stream is received and a probability analysis is employed to isolate noise from the magnitude spectrum. Derived probability information is used for RF detection and localization.

In a further aspect, the probability analysis is a Bayesian probability analysis and the detection and localization algorithm is a modified "you only look once" (YOLO) algorithm.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for detecting, localizing, and classifying RF signals via probability analysis in the decision space. A wideband IQ sample stream is received and a probability analysis is employed to isolate noise from the magnitude spectrum. Derived probability information is used for RF detection and localization. The probability analysis is a Bayesian probability analysis and the detection and localization algorithm is a modified "you only look once" (YOLO) algorithm. The instant disclosure may be more fully understood with reference to U.S. Pat. No. 9,450,688 (issued Sep. 20, 2016).

Figure 1:
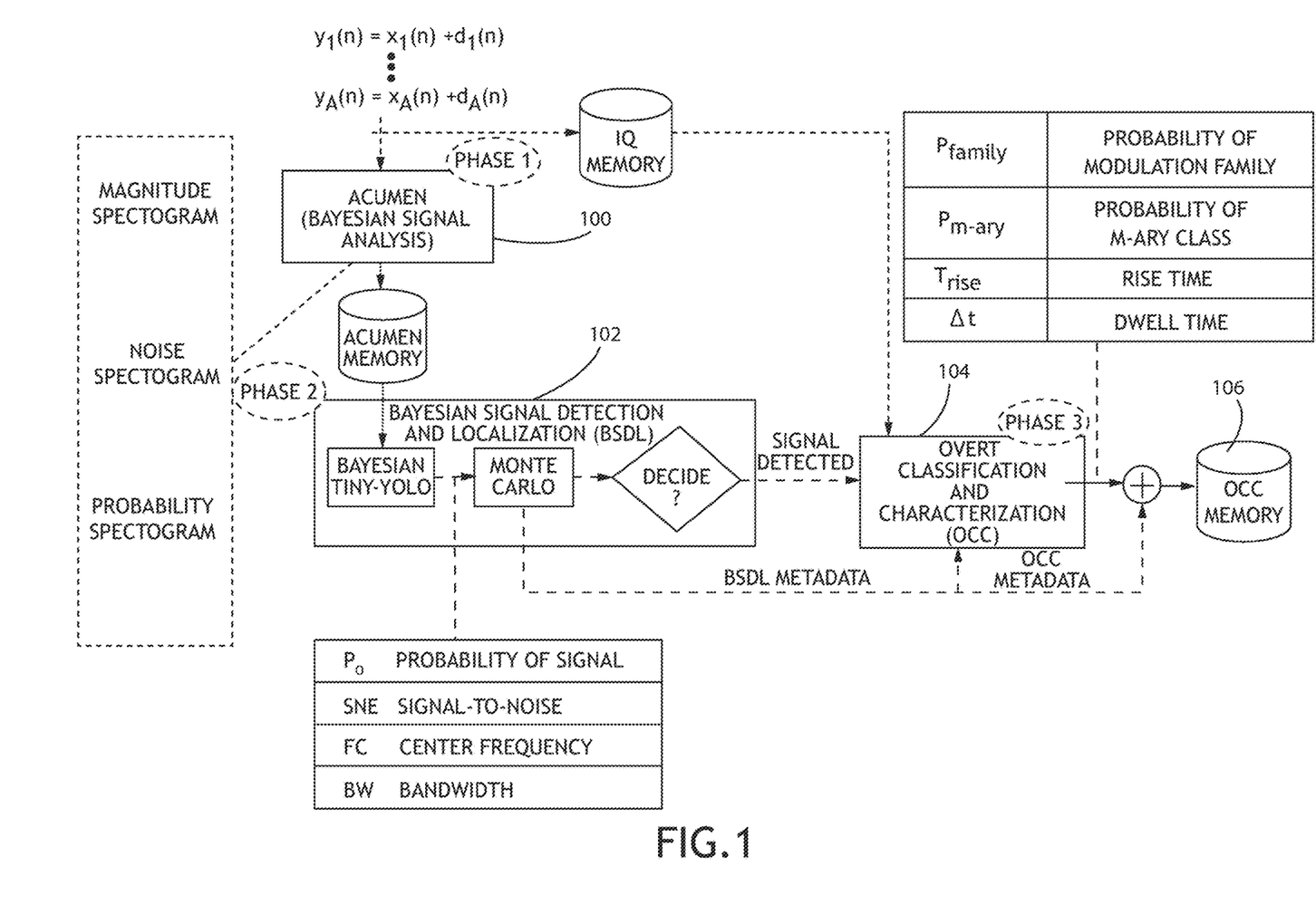
FIG. 1 shows a block diagram of a system for implementing an exemplary embodiment.

Referring to FIG. 1, a block diagram of a system for implementing an exemplary embodiment is shown. A processor executing a probability signal analysis process 100 receives a signal and produces analytical data bout the signal including a magnitude spectrogram, a noise spectrogram, and a probability spectrogram. The signal may comprise a wideband IQ sample stream. The probability analysis, which in at least one embodiment comprises a Bayesian Signal Analysis, isolates the noise and probability from the magnitude spectrum.

After the probability analysis, a probability signal detection and localization process 102 receives the spectrogram information and uses it to detect and localize. Detection and localization may comprise identifying a signal-to-noise ratio, center frequency, and bandwidth. In at least one embodiment, the probability signal detection and localization process 102 utilizes a Bayesian "tiny-YOLO" algorithm acting on a data set of know signal characteristics to identify the signal-to-noise ratio, center frequency, and bandwidth based on known relationships between those characteristics and received signal spectrograms. In at least one embodiment, the probability signal detection and localization process 102 utilizes a Monte Carlo sampling algorithm to sample probability determinations from the Bayesian tiny-YOLO algorithm; such samples may be used by the probability signal detection and localization process 102 to decide if a signal has been detected.

An overt classification and characterization process 104 receives the detected signal decision and Monte Carlo metadata, and uses such data to classify and characterize the signal. The overt classification and characterization process 104 processes the identified center frequency, bandwidth, and signal-to-noise ratio to extract IQ samples from memory, mix to baseband and sample at the Nyquist rate. In at least one embodiment, this form of pre-processing normalizes an input to a defined region.

Since it's difficult to accurately estimate a large number of modulation classes with one network, in at least one embodiment, the overt classification and characterization process 104 breaks the task into two steps: first, the overt classification and characterization process 104 performs modulation family recognition, classifying a signal according to AM, FM, PSK, ASK, QAM, FSK, CDMA, and multicarrier, respectively; second, the overt classification and characterization process 104 classifies the signal according to M-ary modulation order within a given family. In at least one embodiment, both steps utilize a Bayesian Convolutional Neural Networks operating on complex spectral samples.

In at least one embodiment, the output of the overt classification and characterization process 104, or metadata corresponding to such output, may be stored in a memory 106, along with the corresponding probability signal detection and localization process 102 metadata, for future analysis to refine known Bayesian probabilities.

Figure 2:
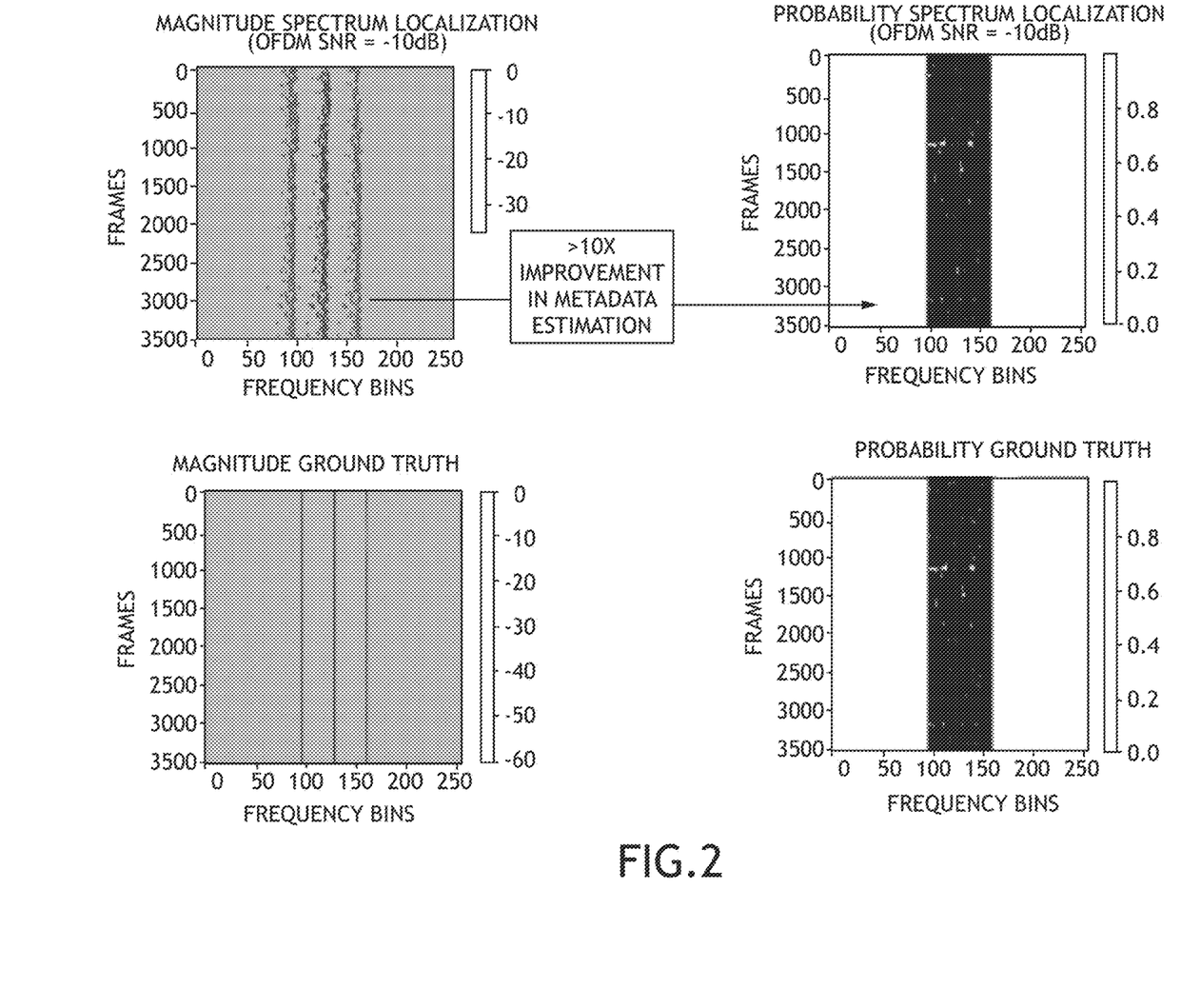
FIG. 2 shows graphs of metadata estimation.
Figure 3:
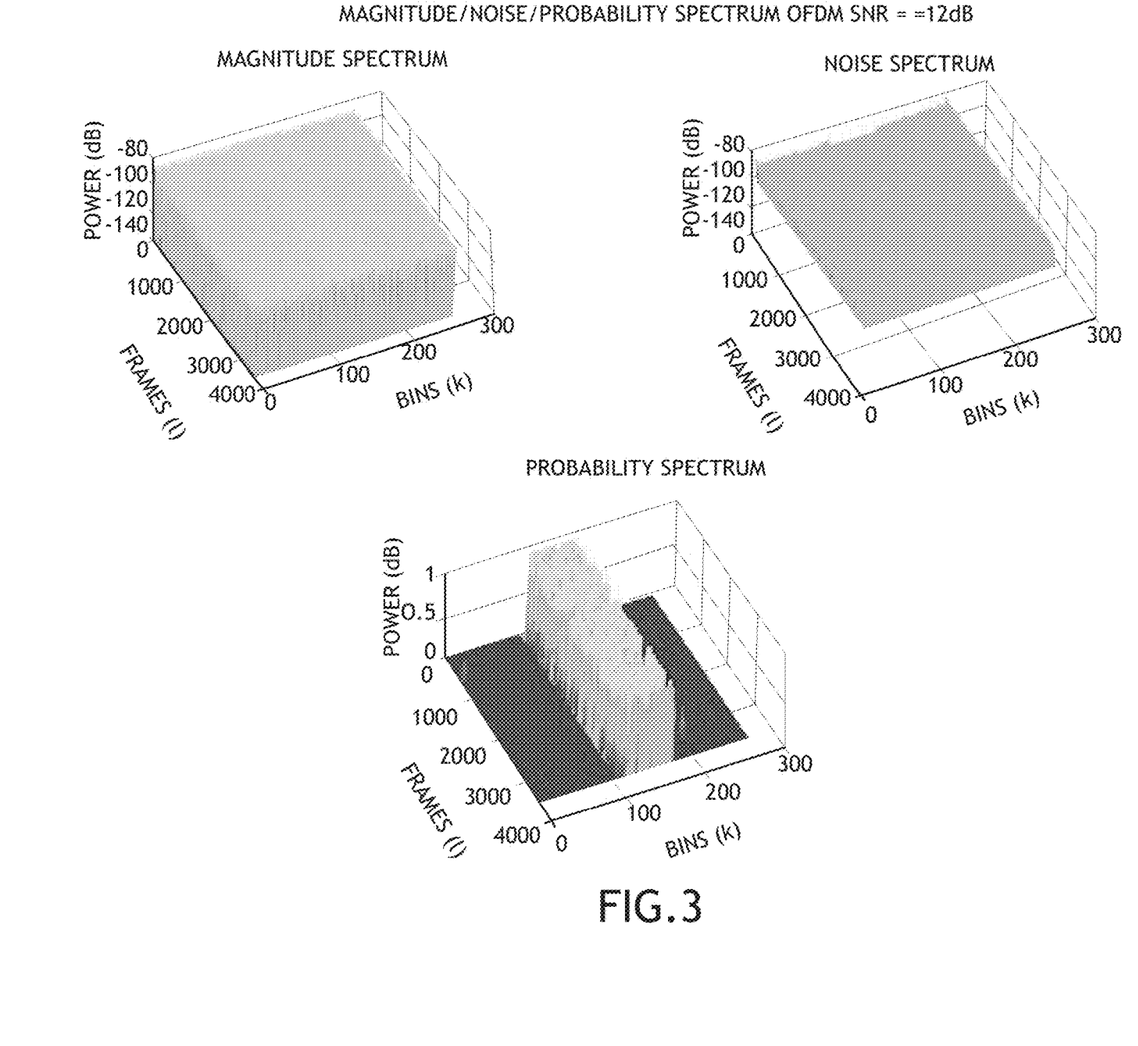
FIG. 3 shows graphs of various aspects of a spectrum with orthogonal frequency detection multiplexing.

Referring to FIGS. 2 and 3, graphs of metadata estimation and of various aspects of a spectrum with orthogonal frequency detection multiplexing are shown. Referring to FIG. 2, center frequency and bandwidth estimates from a tiny-YOLO algorithm trained against the magnitude spectrum and probability spectrum are shown. Utilizing the probability spectrum may provide a greater than ten times increase in accuracy. Referring to FIGS. 2 and 3, the probability spectrum provides greater than ten times improvement in YOLO based metadata estimation in low signal-to-noise ratios. Noise and magnitude spectrums enable accurate YOLO estimation of a signal's signal-to-noise ratio.

Figure 4:
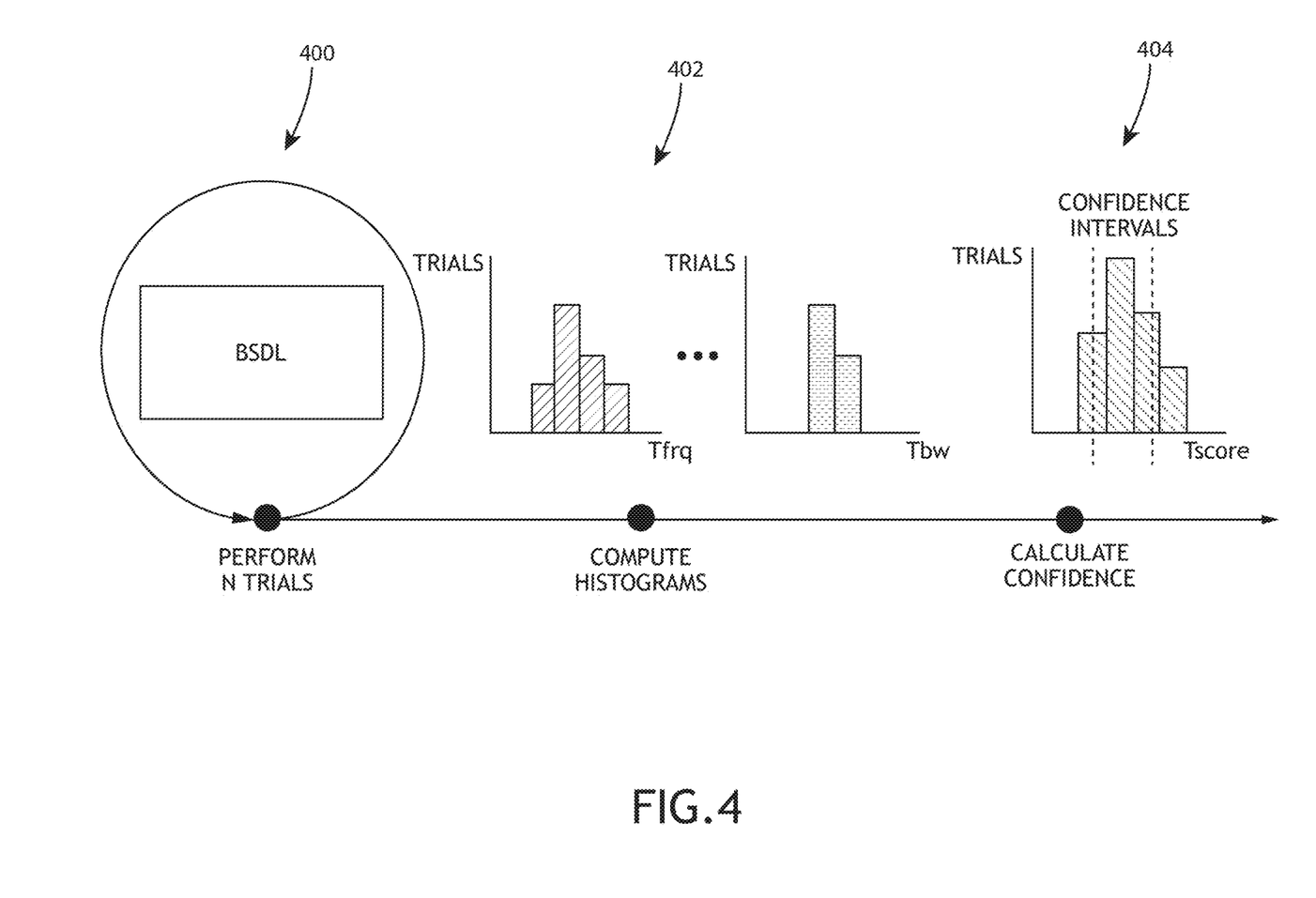
FIG. 4 shows a block diagram of probability signal detection metadata confidence.

Referring to FIG. 4, a block diagram of probability signal detection metadata confidence is shown. Unlike classical YOLO which returns a maximum likelihood estimate for the localization parameters on its output layer, Bayesian YOLO learns or is provided a distribution for the weights and biases that make up each neuron in its architecture. This enables Monte Carlo testing during inference to formulate histograms for each metadata prediction. Bayesian convolutional layers facilitate uncertainty estimation in the predicted results.

In at least one embodiment, the estimation of uncertainty using Bayesian inference is utilized during trials 400, computation of histograms 402, and calculating 404 a confidence level. For example, the confidence in detecting and localizing a signal in a particular band may be high, but the modulation family and M-ary number classification confidence may be low. This combination could signify that there is a signal present in the environment that doesn't fall into the overt classification set triggering further interrogation.

Figure 5A:
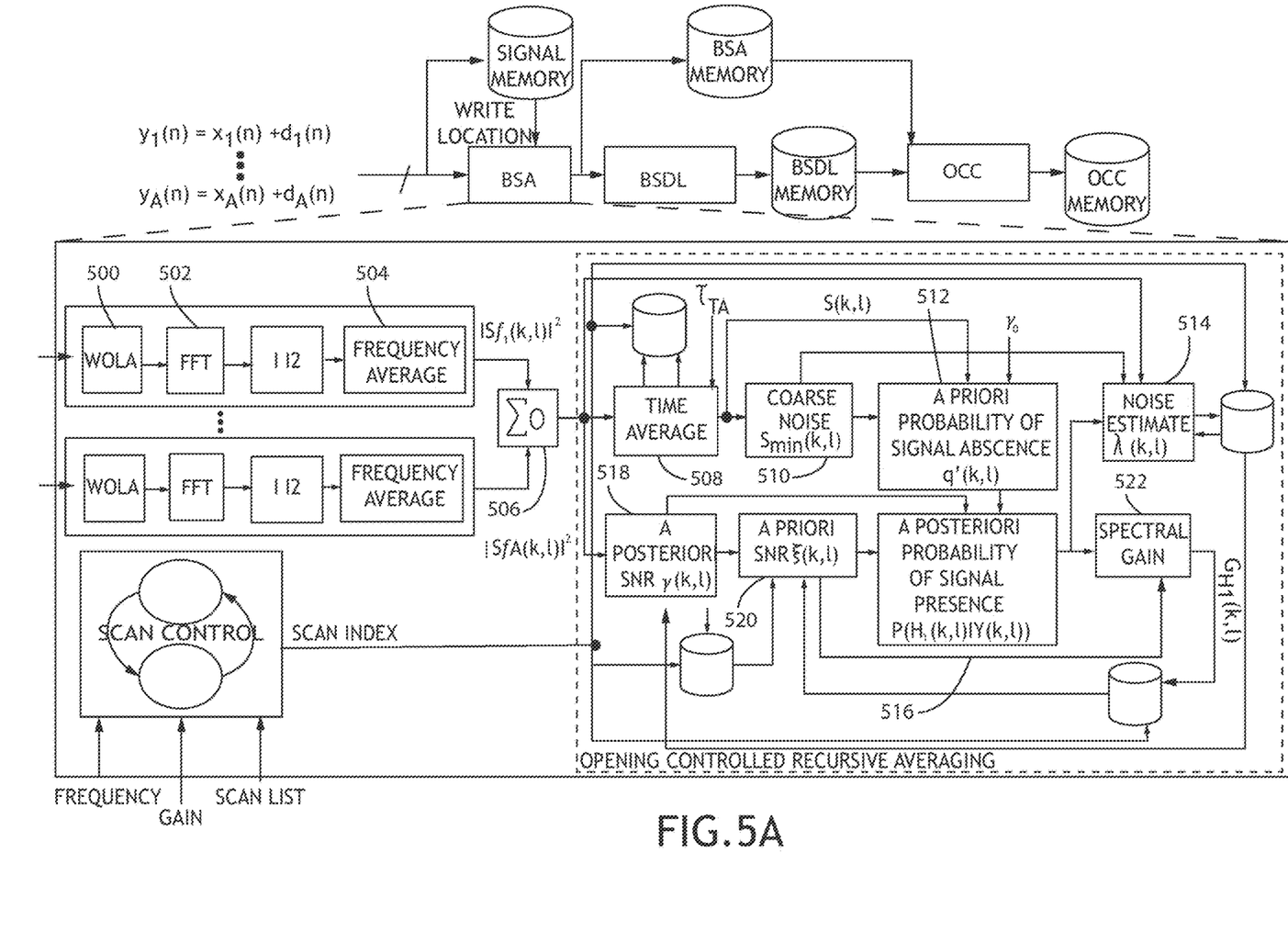
FIG. 5A shows a block diagram of a system for probability signal detection according to an exemplary embodiment.
Figure 5B:
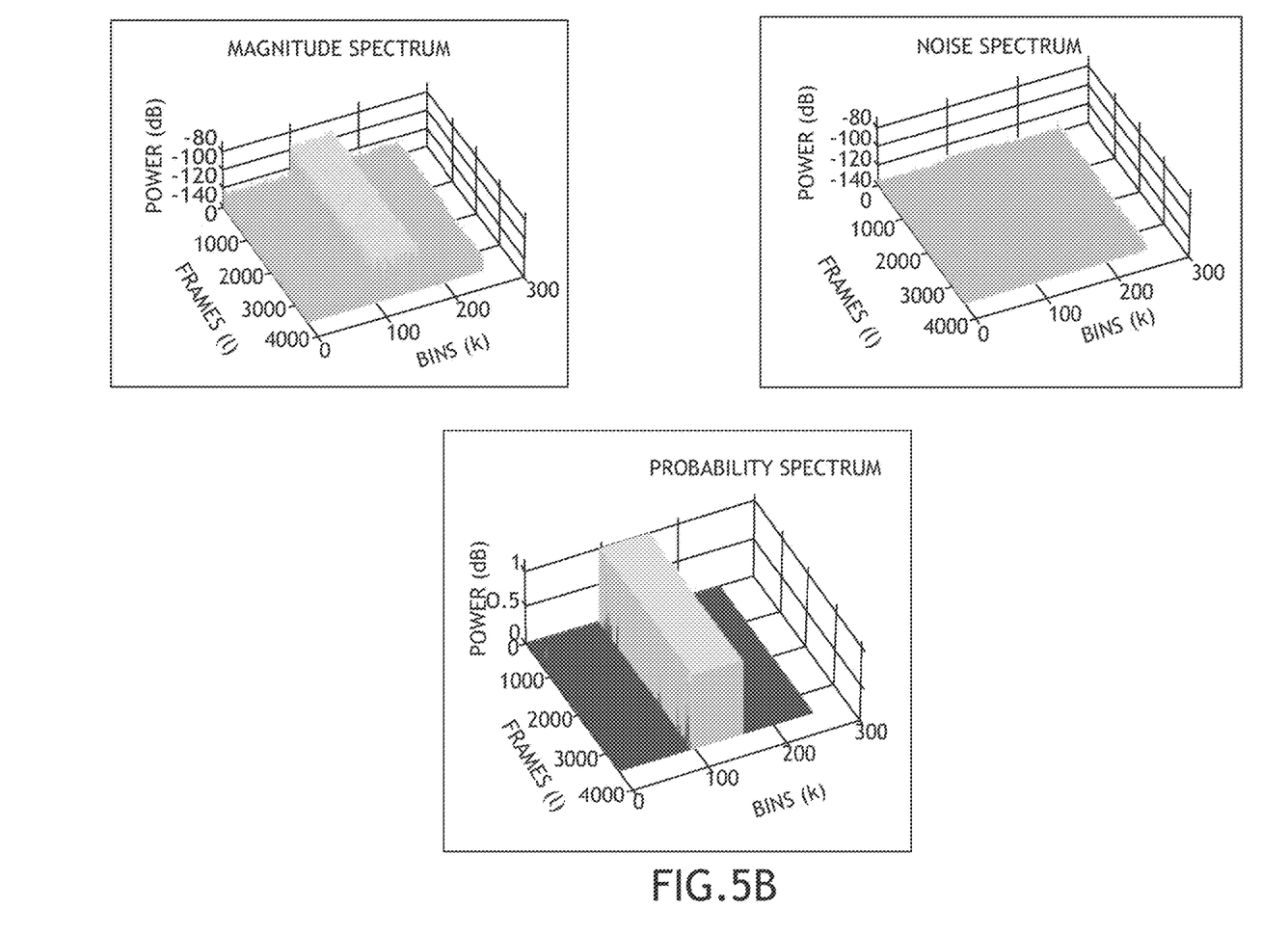
FIG. 5B shows graphs of various aspects of a signal spectrum with respect to the system of FIG. 5A.

Referring to FIGS. 5A-5B, a block diagram of a system for probability signal detection according to an exemplary embodiment and graphs of various aspects of a signal spectrum are shown. A Bayesian signal analysis process (such as probability signal analysis 100 of FIG. 1) encompasses a collection of frequency domain techniques to estimate the probability spectrum based on three key parameters: the a posteriori signal-to-noise ratio $\gamma(k, l)$, the a priori signal-to-noise ratio $\xi(k, l)$, and the a priori probability of signal absence q'(k, l). The a posteriori signal-to-noise defines an instantaneous estimate of the signal-to-noise ratio at frequency bin k and time frame l to enable fast probability spectrum adaptation for "bursty" high signal-to-noise ratio signals. The a priori signal-to-noise ratio defines an average signal-to-noise ratio based on knowledge that a signal is truly present to mitigates probability spectrum false alarms. The a priori probability of signal absence defines a long-term estimate, based on past knowledge, that a signal is absent in bin k at frame l to enable accurate probability spectrum estimation on "persistent" negative signal-to-noise ratio signals.

To calculate the probability spectrum, Bayesian signal analysis process requires an estimate of the spectral noise floor. Unlike classical radar-based techniques, this process does not rely on a communications signal to be absent in order to perform the calculation. In at least one embodiment, a minima controlled recursive averaging (MCRA) algorithm defines the spectral noise floor. Because MCRA was formulated based on statistics of speech, not RF, the Bayesian signal analysis process includes an image de-noising algorithm known as "opening" in addition to MCRA. The combined opening MCRA algorithm for RF noise estimation algorithm may be known as Opening Controlled Recursive Averaging (OCRA).

In at least one embodiment, the Bayesian signal analysis process operates on a maximum number A of independent noisy RF channels $y_a(n)=x_a(n)+d_a(n)$, where $x_a(n)$ is the desired RF signal, $d_a(n)$ is the additive noise, and a is the channel index. Before transforming to the frequency domain, the Bayesian signal analysis process applies a technique known as the weighted overlap add (WOLA) filter 500 to enable detection of signals close in proximity $$s_a(n) = \sum_{p=0}^{P} y_a(n + pN)h(n + pN)$$

where h is the window function, N is the FFT size, and P is the total number of FFT blocks. A discrete FFT 502 is then applied according to:

$$Y_a(k, l) = \sum_{n=0}^{N-1} s_a(n + lPN) e^{-i\frac{2\pi}{N}nk}$$

where k is the spectral bin index and l is the frame index, respectively. After converting to the frequency domain, the spectral power on each channel is smoothed in frequency via a frequency averaging process 504 to reduce "RF popcorn noise" according to:

$$Sf_a(k, l) = \sum_{i=-w}^{w} b(i) |Y_a(k-i, l)|^2$$

where b is a hamming window with span 2w+1. The channels are then non-coherently combined 506 according to:

$$Sf(k, l) = \frac{\sum_{a=1}^{A} |Sf_a(k, l)|^2}{A}$$

The resulting signal is recursively smoothed 508 according to:

$$S(k,l) = a_s S(k,l-1) + (1-a_s) Sf(k,l)$$

where the forgetting factor is given by:

$$\alpha_s = 1 - \frac{1}{\tau_{TA} F_s},$$

time constant $\tau_{TA}$, and update rate $F_s$.

To calculate the spectral noise floor, OCRA utilizes knowledge that in short time periods not all spectral bins contain energy from an emitter. Therefore, a coarse noise estimate 510 is obtained utilizing spectral opening:

$$s_{min}(k, l) = \max_{-Z \le z < Z} S'(k+z, l)$$

with $$S'(k, l) = \min_{-Z \le z < Z} S(k+z, l)$$

where 2Z+1 is the spectral search range. Then a priori probability of signal absence is calculated 512:

$$q'(k, l) = \alpha_p q'(k, l-1) + (1 - \alpha_p) I(k, l)$$

with $$I(k, l) = \begin{cases} 1, & \frac{S(k, l)}{s_{min}(k, l)} < \delta \\ 0, & \text{otherwise} \end{cases}$$

where $a_p$ controls how long a decision l (k, l) is retained, and δ is the signal absence threshold.

The preceding calculations are used to produce the spectral noise estimate 514:

$$\lambda(k, l) = \alpha_d \lambda(k, l-1) + (1 - \alpha_d) Sf'(k, l)$$

with $$Sf'(k, l) = \begin{cases} s_{min}(k, l), & P(H_1(k, l) | Y(k, l)) < .1 \\ Sf(k, l), & \text{otherwise} \end{cases}$$

This equation allows continuous estimation of the RF spectral noise floor under all signal conditions. If a signal is determined to be absent, the noise is updated based on the smoothed channel power Sf(k, l); otherwise, the noise is updated based on the coarse noise estimate $s_{min}$(k, l). Finally, the probability spectrum 516 is determined according to:

$$P(H_1(k, l) | Y(k, l)) = \frac{1 - q'(k, l)}{1 - q'(k, l) + q'(k, l)(1 + \xi'(k, l)) \exp(-v'(k, l))}$$

$$\xi'(k, l) = \frac{\xi(k, l)}{1 - q'(k, l)}$$

and $$v'(k, l) = \frac{\xi'(k, l)}{\xi'(k, l) + 1} \gamma(k, l)$$

The a posteriori signal-to-noise ratio 518 is:

$$\gamma(k, l) = \frac{Sf(k, l)}{\lambda(k, l-1)}$$

and a priori signal-to-noise ratio 520 given by:

$$\xi(k,l) = aG^2_{H1}(k,l-1)\gamma(k,l-1) + (1-a)\max\{\gamma(k,l)-1, 0\}$$

In at least one embodiment, a priori signal-to-noise ratio is determined via a spectral gain function 522 with the Weiner filter criterion:

$$G_{H1}(k, l) = P(H_1(k, l) | Y(k, l)) \frac{\xi(k, l)}{\xi(k, l) + 1}$$

The probability spectrum is high ($P(H_1(k, l)|Y(k, l)) \gg 0$) when a signal is present in the current frame ($\gamma(k, l) \gg 1$) or when a signal has been present for several prior frames ($q'(k, l) \ll 1$). This property allows the Bayesian signal analysis process to bridge the gap between rapid detection of bursty high signal-to-noise ratio communications and the ability to detect persistent low signal-to-noise ratio signals.

Figure 6A:
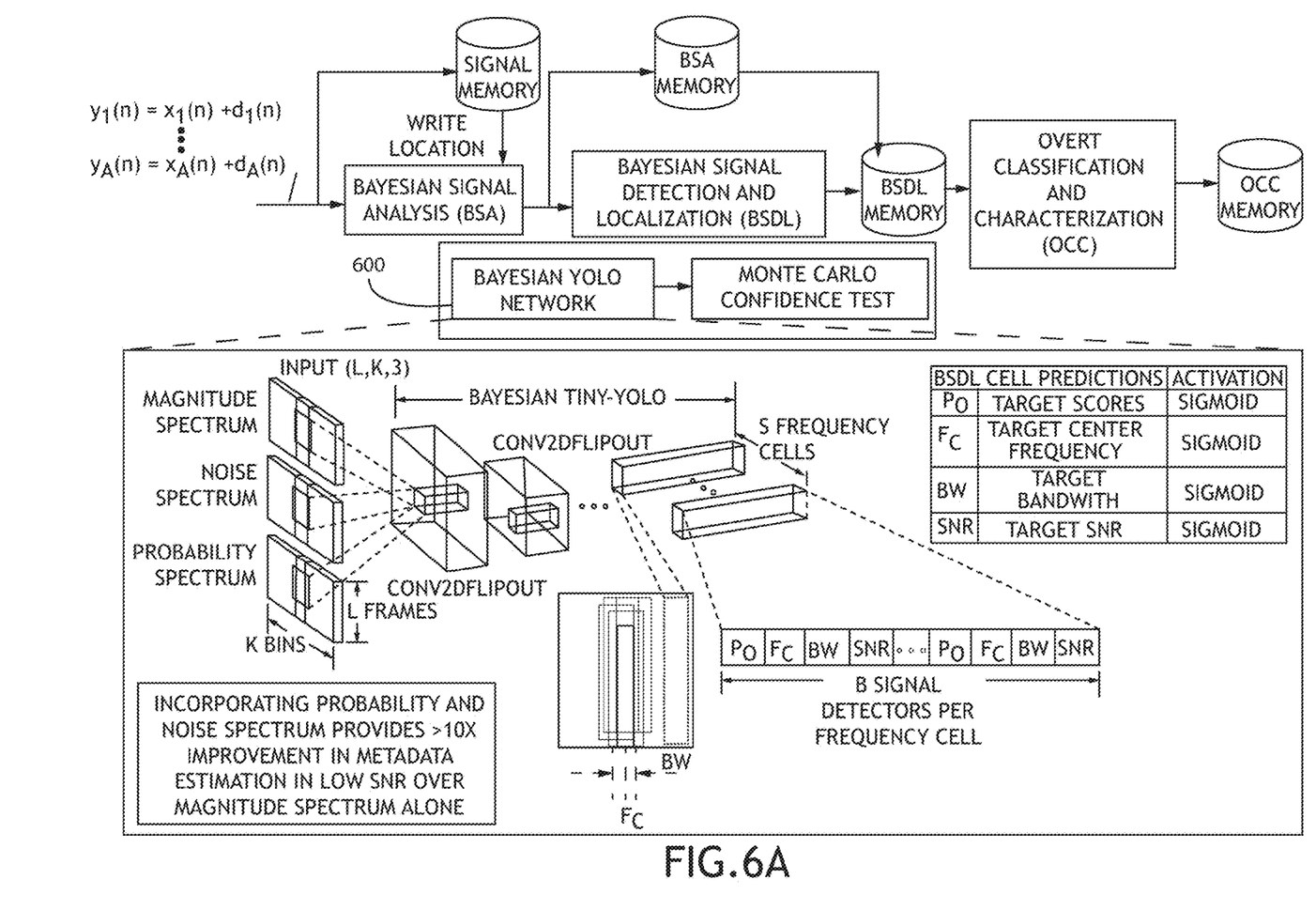
FIG. 6A shows a block diagram of a system for probability signal detection according to an exemplary embodiment.
Figure 6B:
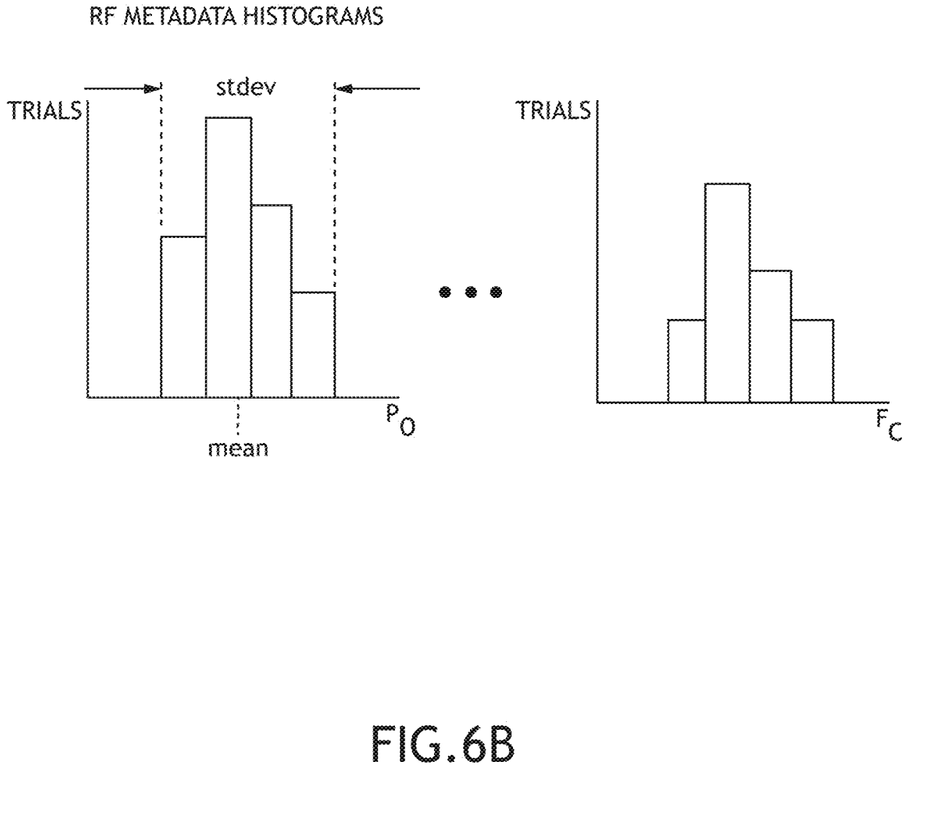
FIG. 6B shows graphs of metadata histograms with respect to the system of FIG. 6A.

Referring to FIGS. 6A-6B, a block diagram of a system for probability signal detection according to an exemplary embodiment and graphs of metadata histograms are shown. Real-time detection, classification, and location of multiple objects within an image is essential to the performance of vision systems in a variety of domains. A Bayesian signal detection and localization process (such as the probability signal detection and localization process 104 of FIG. 1) employs probability, noise, and magnitude spectrum as inputs to a Bayesian YOLO network 600 to enable faster learning, a smaller network architecture, and greater than ten times improvement in metadata estimation in low signal-to-noise ratios as compared to existing processes.

An emitter's burst length can span an unknown amount of time requiring an indefinite time dimension to localize temporally (i.e. calculate dwell time). Therefore, in at least one embodiment, the Bayesian signal detection and localization process localizes in the frequency axis. The time axis is sized based on the number of frames needed to accurately detect a signal in a given frequency cell S. This simplifies the network architecture, requiring half the number of grid cells as compared to existing processes.

In at least one embodiment, the Bayesian YOLO network comprises convolutional flipout layers provided in the TensorFlow Probability in place of hidden layers, transforming the network into a Bayesian tiny-YOLO enabling Monte Carlo testing to estimate the uncertainty for each one of its metadata predictions.

In at least one embodiment, the Bayesian tiny-YOLO loss function includes a term for estimation of the signal-to-noise ratio:

$$\lambda_{coord} \sum_{i=0}^{S} \sum_{j=0}^{B} \mathbb{1}_{ij}^{obj} \left[ (f_i - \hat{f}_i)^2 \right] +$$

$$\lambda_{coord} \sum_{i=0}^{S} \sum_{j=0}^{B} \mathbb{1}_{ij}^{obj} \left[ (\sqrt{BW_i} - \sqrt{\widehat{BW_i}})^2 \right] + \sum_{i=0}^{S} \sum_{j=0}^{B} \mathbb{1}_{ij}^{obj} \left[ (SNR_i - \widehat{SNR_i})^2 \right] +$$

$$\sum_{i=0}^{S} \sum_{j=0}^{B} \mathbb{1}_{ij}^{obj} \left[ (C_i - \hat{C}_i)^2 \right] + \lambda_{noobj} \sum_{i=0}^{S} \sum_{j=0}^{B} \mathbb{1}_{ij}^{noobj} \left[ (C_i - \hat{C}_i)^2 \right]$$

where S is the number of frequency cells, B is the number of signal detectors per frequency cell, and $\lambda_{coord}$ is the weight given to frequency and bandwidth loss calculations. The term $\mathbb{1}_{ij}^{obj}$ is set to one for the detector j in cell i that maximizes the intersection over union (IOU) relative to all other detectors.

Figure 7:
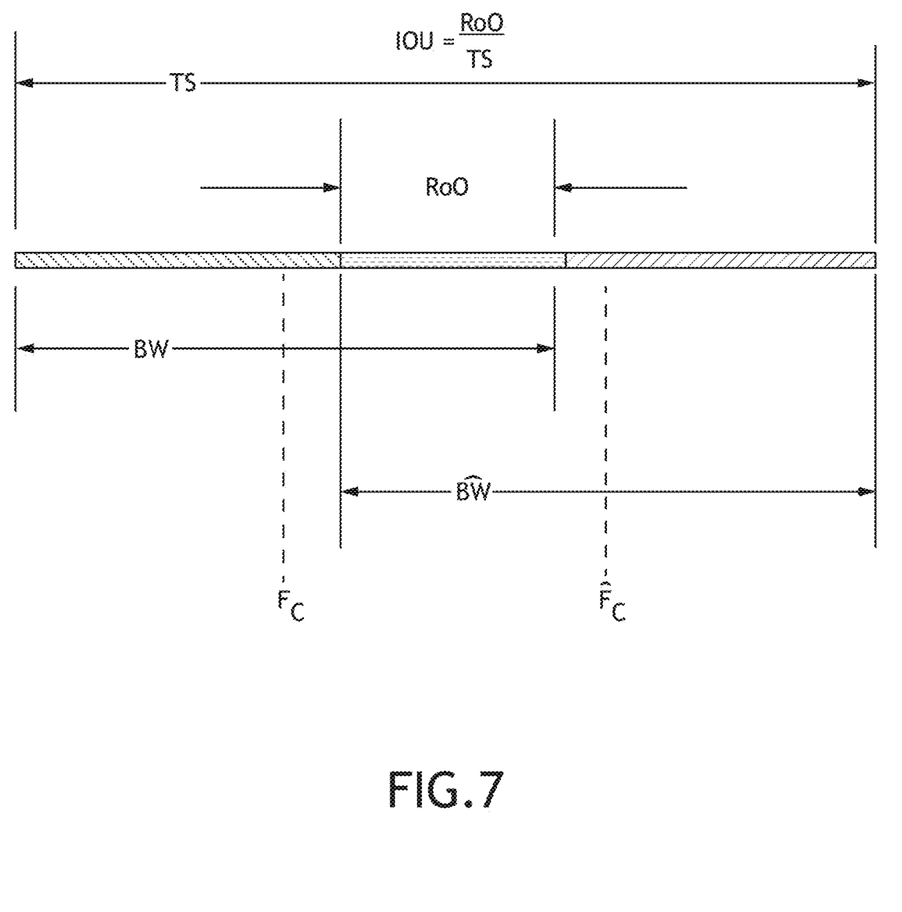
FIG. 7 shows a block representation of center frequency and bandwidth-based intersection.

Referring to FIG. 7, a block representation of center frequency and bandwidth-based intersection is shown. Embodiments of the present disclosure ignore the time dimension of the IOU determination; therefore, IOU simplifies to:

$$IOU = \frac{\text{Region of Overlap } (RoO)}{\text{Total Span } (TS)}$$

Referring to FIGS. 6A and 6B, the term $\mathbb{1}_{ij}^{noobj}$ is set to one for all j detectors that where not selected when maximizing the IOU (when a signal is present in cell i) or one when there is no signal present in cell i. The terms $f_i$, $BW_i$, $SNR_i$, and $C_i$ represent predictions from the Bayesian YOLO network 600 with the terms under the caret denoting the ground truth. The variables $f_i$, $BW_i$, and SNR range between 0 and 1 relative to the span of frequency cell i, total frequency span S, and maximum signal-to-noise ratio of 100 (linear), respectively. The total loss equation does not include loss associated with class.

Figure 8:
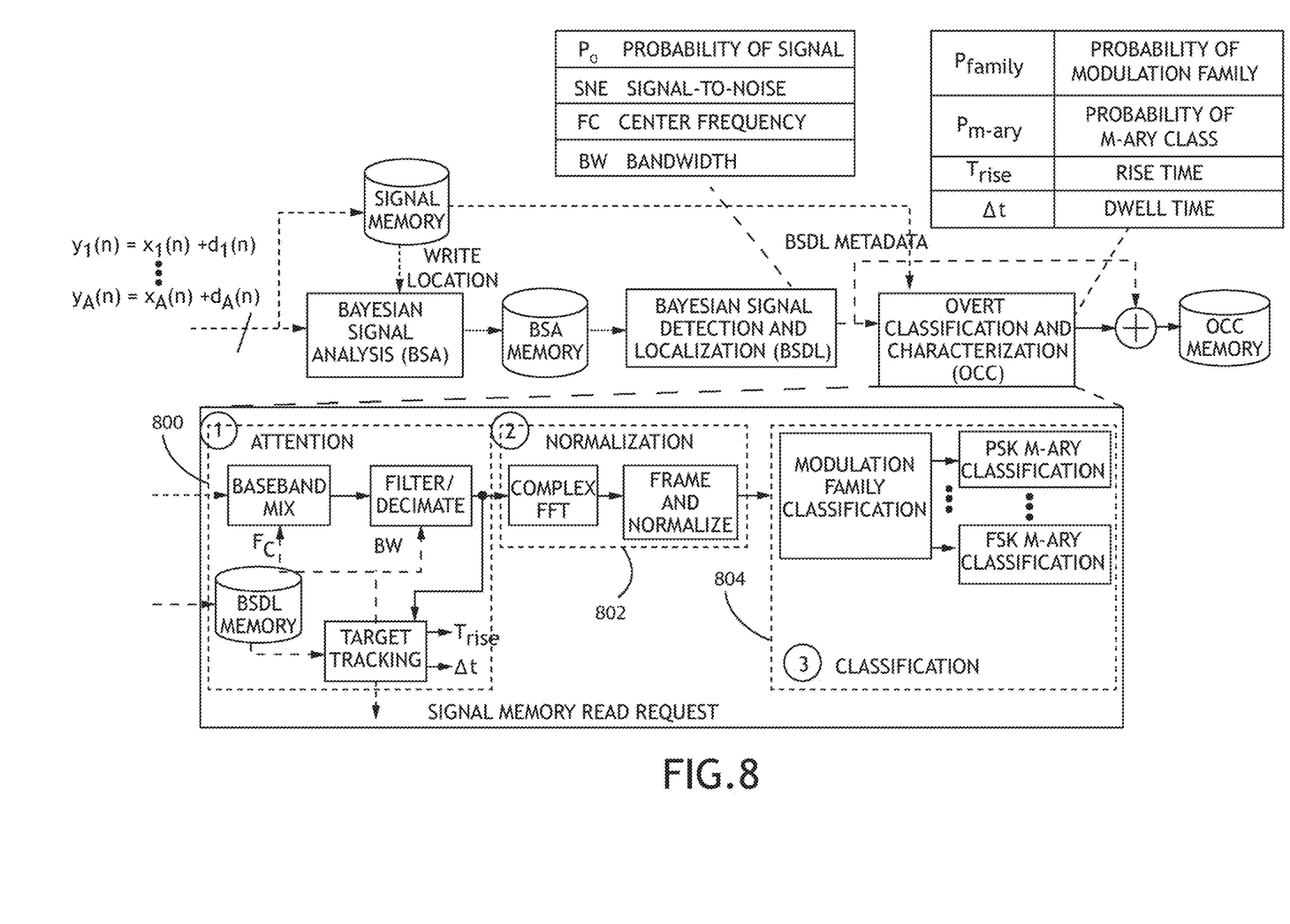
FIG. 8 shows a block diagram of a system for overt signal classification and characterization.

Referring to FIG. 8, a block diagram of a system for overt signal classification and characterization is shown. In at least one embodiment, the process of performing overt classification and characterization is divided into three phases. During a first phase (Attention) 800, target tracking processes targets as they enter the Bayesian signal detection and localization process (such as in FIGS. 6A and 6B). For each target in the buffer, target tracking reads the detection time and requests a block of time-domain IQ samples from a location in signal memory.

A digital down conversation stage removes the estimated frequency offset $F_c$ and decimate to the Nyquist rate according to the bandwidth BW. If this is a new target, target tracking estimates the rise time $T_{rise}$; otherwise it keeps track of the total time the target has been transmitting $\Delta_t$.

During a second phase (Normalization) 802, the baseband block of time-domain IQ samples is transformed into the complex frequency domain. The complex spectral samples are then normalized to the range −1 to 1 by dividing by the maximum spectral magnitude.

During a third phase (Classification) 804, modulation classification is performed by two levels of a Bayesian convolution neural network. The first level estimates the modulation family such as, AM, FM, PSK, FSK, QAM, OFDM, CDMA, and continuous wave (CW). The second level estimates the M-ary number under each modulation family (i.e. PSK4, PSK8, etc.). Breaking the problem into family then M-ary number classification addresses the issue of "over dimensionality" where a single network performs poorly when required to classify too large a data set.

Embodiments of the present disclosure utilize probabilities, and specifically Bayesian probability analysis, to enrich the decision space. Recorded or otherwise pre-determined probabilities are used to process a wideband IQ sample stream, isolating the noise and probability from the magnitude spectrum. During Bayesian Signal Detection and Localization, this information is used to detect and localize signals via the Bayesian Tiny-YOLO algorithm.

A spectrum analyzer embodying the present disclosure returns probabilities for every element in a spectrogram, producing a spectrogram magnitude spectrum and a probability spectrum. The probability spectrum is sensitive and capable of detecting weak signals. A probability, a spectral magnitude, and a noise estimate are provided as inputs to the YOLO algorithm to enhance RF localization.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising at least one processor in data communication with a memory storing processor executable code for configuring the at least one processor to:
 instantiate a probability signal analysis process configured to receive a signal and produce spectrogram data corresponding to the signal, including a probability spectrogram;
 instantiate a probability signal detection and localization process configured to receive the spectrogram data, identify signal characteristics based on the spectrograms and a set of known signal probabilities, and determine if a signal has been detected; and
 instantiate an overt classification and characterization process configured to identify a signal modulation family and a signal modulation order.

2. The computer apparatus of claim 1, wherein the probability signal analysis process is further configured to perform a Bayesian signal analysis.

3. The computer apparatus of claim 2, wherein the probability signal analysis is further configured to establish a spectral noise floor via minima controlled recursive averaging.

4. The computer apparatus of claim 1, wherein the probability signal detection and localization process is further configured to execute a "You-Only-Look-Once" algorithm based on Bayesian analysis of the known signal probabilities.

5. The computer apparatus of claim 4, wherein the signal characteristics comprise a signal-to-noise ratio, a center frequency, and a bandwidth.

6. The computer apparatus of claim 1, wherein the overt classification and characterization process is further configured to identify the signal modulation family and signal modulation order via one or more Bayesian convolution neural networks.

7. The computer apparatus of claim 6, wherein the overt classification and characterization process is further configured to transform IQ-sample domain signals to a complex frequency domain.

8. A method comprising:
performing a probability signal analysis by receiving a signal and producing spectrogram data corresponding to the signal, including a probability spectrogram;
performing a probability signal detection and localization by receiving the spectrogram data, identifying signal characteristics based on the spectrograms and a set of known signal probabilities, and determining if a signal has been detected; and
performing an overt classification and characterization by identifying a signal modulation family and a signal modulation order.

9. The method of claim 8, wherein the probability signal analysis comprises a Bayesian signal analysis.

10. The method of claim 9, wherein the probability signal analysis comprises establishing a spectral noise floor via minima controlled recursive averaging.

11. The method of claim 8, wherein performing the probability signal detection and localization further comprises executing a "You-Only-Look-Once" algorithm based on Bayesian analysis of the known signal probabilities.

12. The method of claim 11, wherein the signal characteristics comprise a signal-to-noise ratio, a center frequency, and a bandwidth.

13. The method of claim 8, wherein performing the overt classification and characterization further comprises identifying the signal modulation family and signal modulation order via one or more Bayesian convolution neural networks.

14. The method of claim 13, wherein performing the overt classification and characterization further comprises transforming IQ-sample domain signals to a complex frequency domain.

15. A spectrum analyzer comprising at least one processor in data communication with a memory storing processor executable code for configuring the at least one processor to:
instantiate a probability signal analysis process configured to receive a signal and produce spectrogram data corresponding to the signal, including a probability spectrogram;
instantiate a probability signal detection and localization process configured to receive the spectrogram data, identify signal characteristics based on the spectrograms and a set of known signal probabilities, and determine if a signal has been detected; and
instantiate an overt classification and characterization process configured to identify a signal modulation family and a signal modulation order.

16. The spectrum analyzer of claim 15, wherein the probability signal analysis process is further configured to perform a Bayesian signal analysis.

17. The spectrum analyzer of claim 16, wherein the probability signal analysis is further configured to establish a spectral noise floor via minima controlled recursive averaging.

18. The spectrum analyzer of claim 15, wherein the probability signal detection and localization process is further configured to execute a "You-Only-Look-Once" algorithm based on Bayesian analysis of the known signal probabilities.

19. The spectrum analyzer of claim 18, wherein the signal characteristics comprise a signal-to-noise ratio, a center frequency, and a bandwidth.

20. The spectrum analyzer of claim 15, wherein the overt classification and characterization process is further configured to identify the signal modulation family and signal modulation order via one or more Bayesian convolution neural networks.

* * * * *